May 23, 1950 S. R. BRICKER 2,508,638
HEATING APPARATUS
Filed Jan. 21, 1949
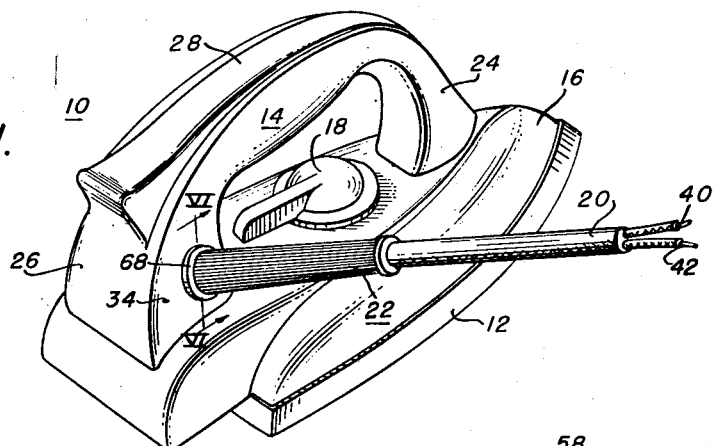
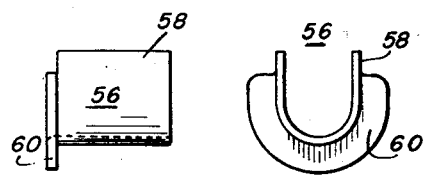
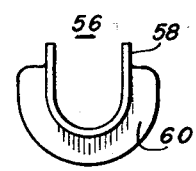
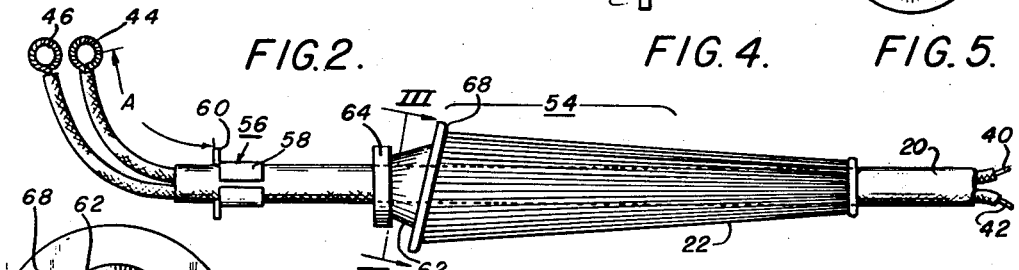
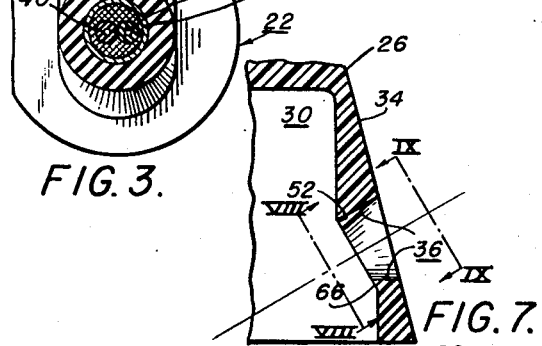
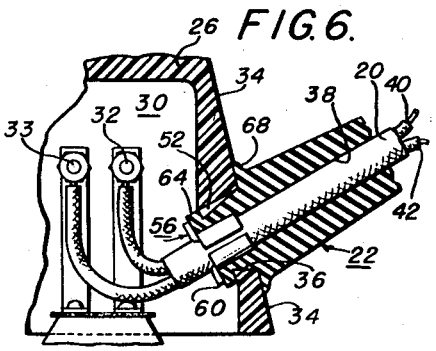
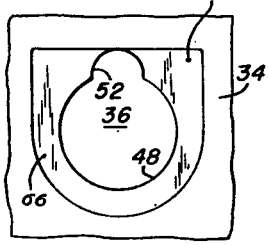
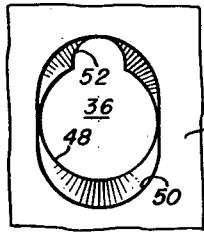
WITNESSES:
INVENTOR
SAMUEL R. BRICKER
BY
ATTORNEY Patented May 23, 1950

2,508,638

UNITED STATES PATENT OFFICE 2,508,638

HEATING APPARATUS

Samuel R. Bricker, Shelby, Ohio, assignor to Westinghouse Electric Corporation, East Pittsburgh, Pa., a corporation of Pennsylvania Application January 21, 1949, Serial No. 71,819

5 Claims. (Cl. 173—322)

This invention relates to electric appliances and has for an object to provide an improved electrical cord attachment therefor.

It is a further object of this invention to provide an improved strain-relief mechanism for an electric iron cord which is self-locking and requires no screw clamps or other extraneous clamping devices.

A still further object is to provide an electric appliance cord strain-relief mechanism which is relatively inexpensive, has fewer component parts and which may be easily and quickly mounted or unmounted without the use of any tools.

These and other objects are effected by the invention as will be apparent from the following description and claims taken in connection with the accompanying drawings, forming a part of this application, in which:

Fig. 1 is a perspective view of an electric iron embodying my invention;

Fig. 2 is a side elevation of the strain-relief mechanism assembled to an electric cord;

Fig. 3 is an enlarged section taken on line III—III of Fig. 2;

Fig. 4 is a side elevation of a locking clip;

Fig. 5 is an end elevation of the locking clip shown in Fig. 4;

Fig. 6 is a fragmentary cross section taken on line VI—VI of Fig. 1;

Fig. 7 is a view similar to Fig. 6 but with the strain-relief mechanism omitted;

Fig. 8 is a view taken in the direction of line VIII—VIII of Fig. 7; and

Fig. 9 is a view taken in the direction of line IX—IX of Fig. 7.

Referring to the accompanying drawing in detail, there is shown, for illustration, an electric flatiron 10 having an electrically heated soleplate 12, a handle 14 rigidly fastened to the soleplate and a cover 16 clamped therebetween. A rotatable knob 18 is disposed on the cover 16 for adjustably controlling the desired temperature of the soleplate as well understood in the art. An electrical cord 20 and a flexible sleeve 22 extend into the handle 14. Other details of the iron have not been shown and need not be described herein, since any desired type may be used.

The handle 14 has a front depending portion 24 and a rear depending portion 26 joined by a generally horizontal grip portion 28. The rear handle portion 26 is hollow to provide a chamber 30 for housing the heater terminals 32 and 33, and has a wall 34 provided with an opening 36 to receive the cord 20 and the sleeve 22.

The flexible sleeve may be made of molded rubber or other flexible material and has a longitudinal bore 38 which freely receives the cord 20. The cord 20 may be of the ordinary insulated type of circular cross section having two conductors 40 and 42. A portion of the outer insulation of the cord may be removed to free a portion of the conductors and the end portions of the conductors are bared and preferably formed into loops 44 and 46 for electrical connections to terminals 32 and 33, respectively.

As shown in Figs. 7, 8 and 9, the opening 36 is inclined with the horizontal to determine the slope of the sleeve 22 and is tapered, resembling the frustum of a cone, but having a generally circular inner periphery 48 and an outer generally elliptical periphery 50. A semi-circular notch 52 is provided in the periphery 48 and is so disposed as to diminish gradually to zero width at the outer periphery 50 for a purpose which will subsequently be described.

As shown in Fig. 2, the cord 20 and the flexible sleeve 22 are pre-assembled to form a unitary sub-assembly structure 54 which may be conveniently and expeditiously connected to the iron. After the sleeve is slipped over the cord and the loops 44 and 46 are formed, a retaining clip 56 having a U-shaped channel-like portion 58 and a U-shaped flange 60 at one end is applied to the cord. The exact position at which the clip is applied is not critical and may be any distance A from the loops 44 and 46 which will provide the desired slack within the chamber 30 for ease of connection. The clip is then crimped into position securely by deforming its U-shaped portion 58 into a circular shape conforming to the cross section of the cord 20.

The flexible sleeve 22 has a tapered portion 62 adjacent one end, substantially the same size and shape as the opening 36, to insure a tight fit therewith. An annular flange 64 is provided adjacent one end of the tapered portion 62 to prevent withdrawal of the sleeve. Adjacent the inner periphery 48 of the opening 36, a flat portion 66 is provided on the inner surface of the wall 34 to act as a seat for the flexible flange 64. A radial flange 68 is disposed adjacent the other end of the sleeve portion 62 to permit proper positioning of the sleeve at final assembly.

The unitary strain-relief and cord structure 54 is preliminarily connected to the handle 14 and the terminal connections are made before the handle is clamped to the iron as will now be described. The end of the cord 20 bearing the loops 44 and 46 is first passed through the opening 36. With the sleeve 24 moved away from the clip 56, the clip is fed through the handle opening 36 by a twisting motion applied to the cord. The notch 52 provides a limited clearance for the clip and permits its flange 60 to pass through the opening by a threading or screw action. The twisting motion may be imparted in either clockwise or counter-clockwise direction as desired. The sleeve 22 is then inserted into the opening 36, the flange 64 being temporarily distorted as it is fed through by an oscillating motion until it seats on the seat 66. The conductor loops 44 and 46 are then fastened to the terminals 32 and 33, respectively. The handle 14 and cover 16 are then fastened to the iron 10 by screws (not shown). With the iron assembled, the cord 20 is pulled until the clip portion 58 enters the sleeve bore 38 and the flange 60 abuts the flexible flange 64. The clip 56 thus acts to spread the sleeve portion 62 into snug engagement with the opening 36. The clip further acts to reinforce the flexible flange 64 and to prevent its being collapsed by any external pull on the sleeve 22. Thus, the flexible sleeve 22 is firmly anchored to the handle 14. Any pull or strain on the cord 20 will be taken up by the clip 56, preventing damage to the electrical connections at the terminals 32 and 33. It will be noted that the flexible sleeve will always be positioned at the proper angle with respect to the soleplate 12 of the iron, since the elliptical contour 50 of the handle opening will receive the portion 62 in only one position.

To replace a damaged cord, such as may be necessary after the iron has been in service, the above sequence of operations is reversed to remove the structure 54, and repeated to assemble the replacement structure.

Although my improved strain-relief mechanism has been described in conjunction with a sadiron, it is to be understood that it is not so limited. It may be used to advantage, for example, in other electrical appliances such as toasters, waffle irons and steam irons.

While I have shown my invention in but one form, it will be obvious to those skilled in the art that it is not so limited, but is susceptible of various changes and modifications without departing from the spirit thereof.

What I claim is:

1. In a strain-relief construction, the combination of a wall having a tapered opening extending therethrough, an electric cord extending through said opening, a flexible sleeve carried by said cord and received in said opening, said sleeve having its end portion tapered and of substantially the same size and shape as said wall opening for snug engagement therewith, said wall having a notched portion extending therethrough substantially coextensive with said opening, said sleeve having a flexible annular flange adjacent said tapered portion and abutting said wall, said cord having a metal clip firmly clamped thereon, said clip having a substantially U-shaped flange abutting said flexible flange, said U-shaped flange being larger than the small end of said wall opening and adapted to be inserted therethrough by a twisting motion through said notch and said flexible flange being larger than the small end of said wall opening and adapted to be temporarily deformed while being inserted therethrough, said clip thereafter acting to lock said sleeve to said wall and to take up all external strain on the cord.

2. The structure recited in claim 1 in which said tapered opening is generally circular in shape at its small end and is generally elliptical in shape at its large end to receive said sleeve in only one position.

3. In an electric appliance the combination of a plurality of electric terminals, a housing therefor, said housing including a wall having a tapered opening therethrough, an electric cord extending through said opening, said cord having a plurality of electrical conductors attached to said terminals, a flexible sleeve carried by said cord and received in said opening, said sleeve having its end portion tapered and of the same size and shape as said opening for snug engagement therewith, said wall having a notched portion extending therethrough and substantially co-extensive with said opening, said sleeve having a flexible annular flange adjacent said tapered portion and abutting said wall, said cord having a metal clip firmly clamped thereon, said clip having a flange abutting said flexible flange, the flange of said clip being larger than the small end of said tapered opening and adapted to be inserted therethrough by a twisting motion, said notch permitting entry of the clip by said motion, and said flexible flange being adapted to be temporarily deformed during insertion through said opening, said clip acting to lock said sleeve to the housing wall and to take up all external strain on the cord.

4. The structure recited in claim 3 in which said tapered opening is generally circular in shape at its small end and is generally elliptical in shape at its large end to receive said sleeve in only one position.

5. In a strain-relief construction, the combination of a wall having a tapered opening extending therethrough, an electric cord extending through said opening, a flexible sleeve carried by said cord and received in said opening, said sleeve having its end portion tapered and of substantially the same size and shape as said wall opening for snug engagement therewith, said sleeve having a flexible annular flange adjacent said tapered portion and abutting said wall, said cord having a metal clip firmly clamped thereon, said clip having a flange abutting said flexible flange, the flange of said clip being larger than the small end of said wall opening, said wall opening being notched and adapted to allow insertion therethrough of said clip by a threading motion, and said flexible flange being larger than the small end of said wall opening and adapted to be temporarily deformed while being inserted therethrough, said clip thereafter acting to lock said sleeve to said wall and to take up all external strain on the cord.

SAMUEL R. BRICKER.

REFERENCES CITED

The following references are of record in the file of this patent:

UNITED STATES PATENTS

| Number | Name | Date |
| --- | --- | --- |
| 2,226,610 | Heyman | Dec. 31, 1940 |
| 2,367,996 | Clark et al. | Jan. 23, 1945 |